United States Patent [19]

Brinson

[11] 4,039,226
[45] Aug. 2, 1977

[54] RETENTION ELEMENT FOR WHEEL COVERS

[75] Inventor: Thomas Frederick Brinson, Lake Park, Ga.

[73] Assignee: International Telephone and Telegraph Corporation, New York, N.Y.

[21] Appl. No.: 615,820

[22] Filed: Sept. 22, 1975

[51] Int. Cl.² .............................................. B60B 7/06
[52] U.S. Cl. .................................................. 301/37 B
[58] Field of Search .................. 24/73 HC; 301/37 R, 301/37 P, 37 T, 37 C, 37 CD, 37 TP, 37 PB, 37 B, 37 L, 108 R, 108 D

[56] References Cited

U.S. PATENT DOCUMENTS

| | | | |
|---|---|---|---|
| 2,815,986 | 12/1957 | Landell | 301/37 B |
| 2,870,879 | 1/1959 | Gaylord et al. | 301/37 B |
| 3,317,249 | 5/1967 | Dagobert | 301/37 B |
| 3,881,778 | 5/1975 | Buerger | 301/37 R |

*Primary Examiner*—Stanley H. Tollberg
*Attorney, Agent, or Firm*—James B. Raden; William J. Michals

[57] ABSTRACT

A wheel cover having an annular, axially directed flange of a diameter slightly less than the inner diameter of the wheel rim is disclosed. Retention elements comprising circumferentially elongated portions formed integrally with, or struck out of, the flange at regularly spaced intervals are provided. Each element is integral with the flange near the free end of the flange. Each retention element includes at least one pair of retention teeth at the radially outer portion of the flange which engages the wheel rim. The retention teeth pairs are formed by providing an off-center, generally V-shaped cutout portion at the edge of the retention element wherein one leg of the V is substantially longer than the other leg. Accordingly, a pair of teeth are provided on each element, the first tooth providing a sharp projecting spur for bitingly engaging the wheel rim. The second tooth provides a strong tooth which bitingly engages the wheel rim and which further resists axial movement of the wheel cover with respect to the wheel rim.

5 Claims, 3 Drawing Figures

RETENTION ELEMENT FOR WHEEL COVERS

BACKGROUND OF THE INVENTION

This invention relates to wheel covers and, more particularly, to an improved retention means for removably fastening the wheel cover to an associated automotove wheel rim.

Wheel covers of both the one-piece and two-piece construction are well known in the art and have utilized retention means, as an integral part of the axially directed flange structure, which functions to bitingly engage the adjacent automotive wheel rim. Such wheel covers are exemplified in the U.S. patents to Lyon No. 2,624,634 and to Dagobert No. 3,317,249. In both of these patents, the retention means are provided generally at the free ends of a plurality of axially inwardly directed extensions of the axial flange. Such structure utilizes the relative resiliency of the extensions to cause the edges of retention teeth, provided at the radially outer edge of the extensions, to bitingly engage the associated wheel rim. This flexible biting engagement is necessary to secure the wheel cover to the wheel rim during the shocks an strains encountered in various driving conditions. Further, even under normal driving conditions the wheel cover flexes in response to flexing of the associated wheel as the wheel rotates. Accordingly, the retaining fingers must retain their biting engagement with the wheel rim even while the wheel cover flexes in response to rotation of the wheel. This engagement is necessary to prevent the wheel cover from becoming dislodged from the wheel rim and to prevent relative rotation between the wheel cover and the wheel rim.

The object of the teeth provided in these prior art wheel covers is to bite into the metal of the wheel rim to resist such relative rotation and axial movement of the wheel cover. For purposes of the present discussion, the penetration, or bite, of the tooth is dependent upon two factors. First, the bite is dependent on the force applied, and secondly, on the sharpness of the tooth. Accordingly, even if the force provided by the deflected extension is held constant, the penetration or bite would be increased by sharpening the teeth. Thus, to ensure meeting the requirements of standard industry torque and drop tests for the various types of wheel covers, it follows that by increasing the sharpness of the respective retention teeth, the desired retention characteristics would be enhanced. However, as the sharpness of the typically work-hardened retention element edges is increased, their susceptibility to damage due to axial forces on the wheel cover increases. Thus, the need exists for increasing the biting penetration of the retention teeth to achieve a greater overall holding power without sacrificing the axial force holding power.

These desired retention characteristics are attained by the present invention wherein there is provided an improved retention means for wheel covers and wherein each retention element includes at least one pair of retention teeth. Each pair is provided with a first relatively sharp tooth for biting engagement with the wheel rim and a second or relatively blunt stong tooth to resist axial displacement of the wheel cover and to otherwise provide support for its adjacent sharp tooth.

SUMMARY OF THE INVENTION

Briefly, a wheel cover for engagement with an automotive wheel rim of the type having an annular axially extending flange of a diameter slightly less than the inner diameter of the wheel rim is provided. A plurality of retention elements are regularly spaced about the circumference of, and integrally formed with, the flange near its free end. Each retention element includes at least one pair of retention teeth at the radially outer portion or edge of the retention element. The retention teeth pairs are provided by generally V-shaped cutout portions wherein the apex of the V is spaced off-center, thereby to form both a sharp projecting tooth and a relatively blunt or strong projecting tooth. The sharp tooth bitingly engages the wheel rim to resist relative rotation between the wheel cover and the wheel rim and the strong tooth bitingly engages the wheel rim to further resist axial movement of the wheel cover.

BRIEF DESCRIPTION OF THE DRAWINGS

The advantages of this invention will become more readily appreciated as the same becomes better understood by reference to the following detailed description when taken in conjunction with the accompanying drawing wherein.

DETAILED DESCRIPTION

Figure 1:
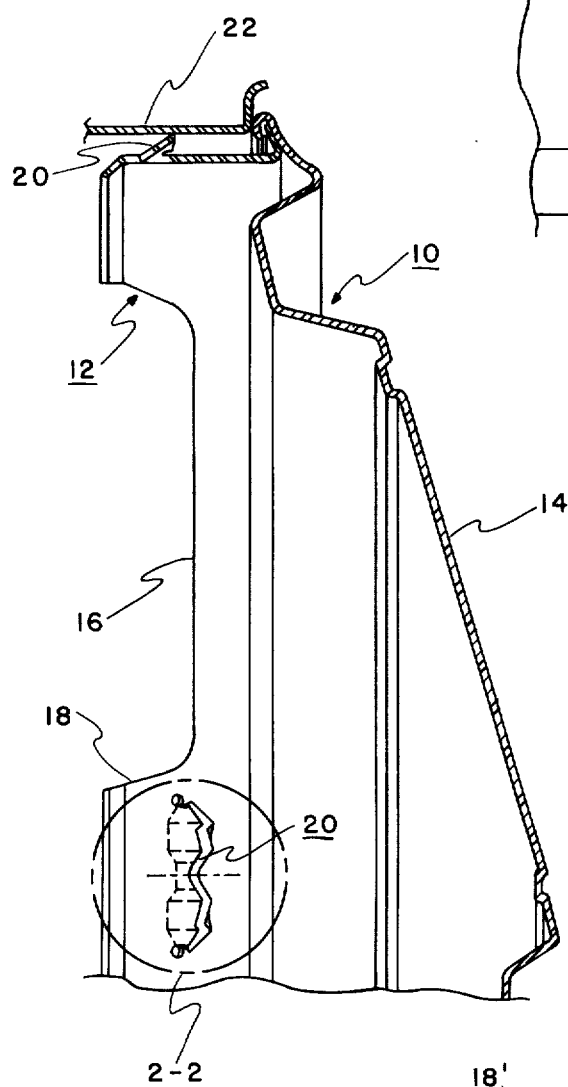
FIG. 1 is a partial sectional view of a wheel cover utilizing the improved retention element in accordance with the principles of the present invention.

Referring now to FIG. 1, there is shown generally at 10 a wheel cover incorporating the improved retention means in accordance with the principles of the present invention. Wheel cover 10 is of a two-piece construction including a retaining ring 12 and a decorative or cover member 14. Cover member 14 is spun, rolled or clinched about a folded-over or hemmed portion of retaining ring 14. Of course, member 14 may be rolled or clinched about a single thickness or retention ring 12 —as illustrated and described in the co-pending application of Toal et al., filed Feb. 20, 1975, as Ser. No. 551,095 and which is assigned to the same assignee as the present invention— or otherwise fastened to retention ring 12 by way of any other suitable means. Retention ring 12 comprises a substantially rigid annular and axially directed flange which is preferably made of a spring steel or stainless steel such as, for example, 301 stainless steel. Cover member 14 may also comprise stainless steel or it may comprise aluminum as illustrated and described in the copending application of Kafoure et al., filed Mar. 3, 1975, as Ser. No. 554,482 and which is also assigned to the same assignee as the present invention. It should also be appreciated that wheel cover 10 may be of a one-piece construction wherein the axially directed flange 12 is integrally and continuously formed with the cover member 14.

Figure 3:
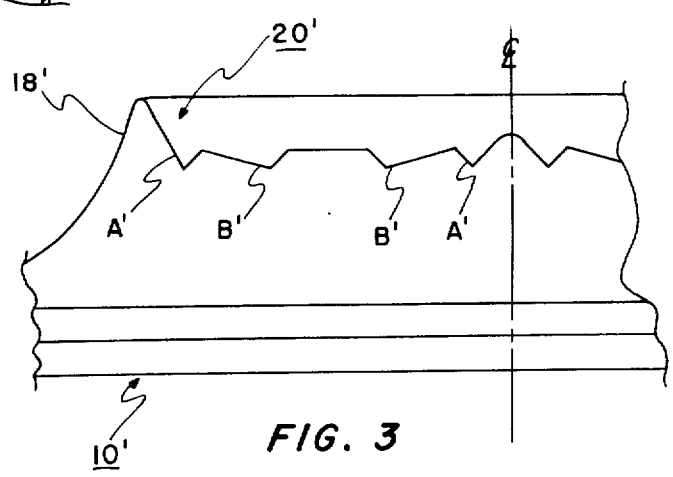
FIG. 3 is a fragmentary view of the retaining finger of another typical wheel cover shown in conjunction with an alternate embodiment of the retention means in accordance with the present invention.

It can be seen by reference to FIG. 1 that the basic wheel cover retention means follows the teachings of the U.S. Patent to Dagobert, No. 3,317,249. Of course, the basic retention means may take the form of the type illustrated in the U.S. Patent to Lyon, No. 2,624,634. This alternate basic retention means is illustrated in FIG. 3 as will be described more fully hereinafter.

Retaining ring 12 of FIG. 1 takes the form of an axially directed flange having arcuate cutout portions 16 which provide axially inward directed extensions 18. Accordingly, this construction provides a relatively resilient finger upon which retention elements 20 are disposed for resilient engagement with the corresponding radially facing axial flange of wheel rim 22. It can be seen that the radially outer portions of retention elements 20 bitingly engage the radially facing flange of wheel rim 22.

Figure 2:
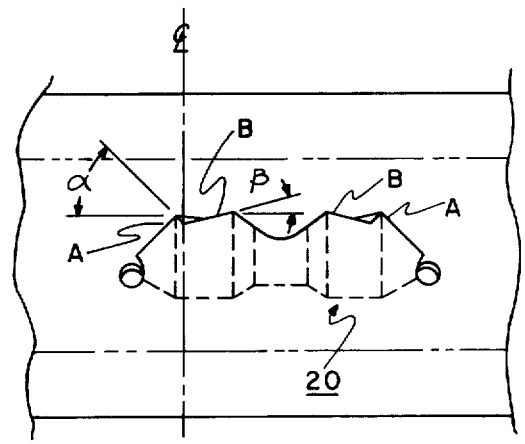
FIG. 2 is an enlarged view of the encircled portion of FIG. 1 illustrating one embodiment of the improved retention means in accordance with the present invention.

Referring now to FIG. 2, there is shown an enlarged view of the encircled portion 2—2 of FIG. 1 and illustrating more particularly a single retention element 20 which includes retention teeth in accordance with the teachings of the present invention. It can be seen that the basic form of retention element 20 is structurally similar to the retention elements shown in the Dagobert patent. However, rather than providing straight edge portions as shown in the Dagobert patent, retention element 20 of FIG. 2 further includes two pairs of retention teeth in accordance with the present invention. Each pair includes a sharp tooth or spur A and a relatively dull or strong tooth B. Teeth A and B are formed by providing an off-centered V-shaped cutout portion in the otherwise straight edge of retention element 20. It can be seen that the off-set center line at the apex of the triangular cutout portion is substantially displaced from the geometric center line of the structure which provides each pair of retention teeth. In currently preferred practice, the slope of the sharp teeth A forms an angle $\alpha$ of approximately 45°; and the slope of the strong tooth B forms an acute angle $\beta$ of approximately 15°.

Thus, there is provided in accordance with the principles of the present invention a sharp tooth A which provides more bite or penetration into the associated wheel rim, and therefore, more holding power and resistance to relative rotation between wheel cover 10 and wheel rim 22, with no more force than that provided and applied in prior art wheel covers. Further, the adjacent strong tooth B resists movement of the wheel cover 10 in the perpendicular direction with respect to the direction of relative rotation between the wheel cover 10 and wheel rim 22. It should be appreciated that the off-centered V-shaped cutout can readily be provided in the die which is used during the process of bending, forming or striking retention element 20 from the axially directed flange 12 of wheel cover 10. That is, this unique geometric and structural configuration can readily be provided by providing complementary or corresponding structure on the die which forms retention element 20.

Referring now to FIG. 3, there is shown an alternate, and preferred, embodiment of the improved retention element means in accordance with the present invention. FIG. 3 is a fragmentary view of a portion of a one-piece wheel cover 10' and, more particularly, the retaining finger flange portion which is disposed between arcuate cutout portions of the overall wheel cover 10'. That is, retaining finger flange 18' corresponds to extention 18 of FIG. 1 and is provided with 60 retention elements along a radially turned extending stiff edge of relatively narrow width in a radially outward direction. Thus, retaining finger flange 18' is also resiliently yieldably in a radial direction upon its stiff edge engaging the wheel rim thereby to hold the edge in resilient gripping biting engagement with the wheel rim. It can be seen that retention element 20' of FIG. 3 is provided with four pairs of retention teeth, A' and B', which are symmetrically disposed about the center line of retaining finger flange 18'. Thus, the strong and sharp tooth function provided by teeth A' and B' is essentially identical to the function provided by teeth A and B of FIGS. 1 and 2.

What has been taught, then, is an improved retention means for wheel covers facilitating, notably, better retention characteristics with respect to relative rotation of the wheel cover with respect to the wheel rim and increased resistance to axial displacement of the wheel cover with respect to the wheel rim. In one constructed embodiment, it has been found that the retention means in accordance with the principles of the present invention provided a substantial increase in the holding power of the wheel cover in a standard torque test. The forms of the invention illustrated and described herein are but preferred embodiments of these teachings. They are shown as an illustration of the inventive concepts, however, rather than by way of limitation, and it is pointed out that various modifications and alterations may be indulged in within the scope of the appended claims.

Having thus described my invention, what I claim as new and desire to protect by United States Letters Patent is:

1. A wheel cover for engagement with an automotive wheel rim and having an annular axially extending flange of a diameter slightly less than the inner diameter of said wheel rim:

a plurality of retention elements regularly spaced about the circumference of and integrally formed with the flange near the free end thereof and extending radially and axially outwardly from said flange;

each retention element including at least one offcentered generally V-shaped edge cutout portion forming a pair of retention teeth wherein said cutout portion is generally triangular with the apex of the triangle being spaced apart from the midpoint between said pair of retention teeth, thereby to form a pair of retention teeth comprising a sharp projecting tooth and a strong projecting tooth with each pair of said teeth lying along a common circle and wherein the projecting edges of said teeth extend substantially equally radially outwardly and reside substantially in a plane parallel to the plane of said wheel cover and said teeth being resiliently flexible in the axial direction; and, wherein said sharp tooth bitingly engages and penetrates said wheel rim to resist relative rotation between said wheel cover and said wheel rim, and wherein said strong tooth engages said wheel rim to resist axial movement of said wheel cover.

2. The wheel cover according to claim 1, wherein the ratio of the angles formed between the sides of said generally V-shaped portion and the imaginary line bewteen the points of said teeth is at least 2:1.

3. The wheel cover according to claim 2, wherein said angles are approximately 45° and 15°, respectively.

4. A wheel cover for engagement with an automotive wheel rim and having an annular axially extending flange of a diameter slightly less than the inner diameter of said wheel rim:

a plurality of retention elements regularly spaced about the outer circumference of and integrally formed with the flange near the free end thereof and each element including an edge portion extending radially and axially outwardly of said flange;

said edge portion including at least one off-centered cutout portion to form an unsymmetrical pair of retention teeth, wherein said cutout portion is generally triangular with the apex of the triangle being spaced apart from the midpoint between said pair of retention teeth, and said pair including a sharp projecting tooth incorporating the short leg of said triangle and adjacent to a relatively blunt, strong projecting tooth which incorporates the long leg of said triangle with each pair of said teeth lying along a common circle and wherein the projecting edges of said teeth extend substantially equally radially outwardly and reside substantially in a plane parallel to the plane of said wheel cover and said teeth being resiliently flexible in the axial direction; and, wherein said sharp tooth bitingly engages said wheel rim to resist relative rotation between said wheel cover and said wheel rim, and wherein said strong tooth engages said wheel rim to resist axial movement of said wheel cover.

5. The wheel cover according to claim 4, wherein the leg of said triangle which defines said strong tooth is at least twice as long as the leg defining said sharp tooth.

* * * * *